US011893287B1

(12) United States Patent
Wong (10) Patent No.: US 11,893,287 B1
(45) Date of Patent: Feb. 6, 2024

(54) GRAPHICS AND IMAGE PROCESSING FOR DEBUGGING FOR A PRINTING

(71) Applicant: KYOCERA Document Solutions Inc., Osaka (JP)

(72) Inventor: Kendrick Esperanza Wong, Torrance, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/886,749

(22) Filed: Aug. 12, 2022

(51) Int. Cl.
    *G06F 3/12* (2006.01)
(52) U.S. Cl.
    CPC ............ *G06F 3/121* (2013.01); *G06F 3/1234* (2013.01); *G06F 3/1273* (2013.01); *G06F 3/1287* (2013.01)
(58) Field of Classification Search
    CPC ...... G06F 3/121; G06F 3/1234; G06F 3/1273; G06F 3/1287
    See application file for complete search history.

(56) References Cited

U.S. PATENT DOCUMENTS

| 10,939,019 | B1 | 3/2021 | Nakamura et al. | |
| 11,039,037 | B2 | 6/2021 | Nakamura et al. | |
| 2003/0101322 | A1* | 5/2003 | Gardner | G06F 12/1491 711/163 |
| 2013/0330021 | A1* | 12/2013 | Bansal | G06T 11/60 382/309 |
| 2017/0223228 | A1* | 8/2017 | Shaw | G06T 3/40 |
| 2018/0018936 | A1* | 1/2018 | Staudenmaier | G09G 3/2092 |

\* cited by examiner

*Primary Examiner* — John R Wallace
(74) *Attorney, Agent, or Firm* — W. Eric Webostad (57) ABSTRACT

Systems and methods relate generally to graphics and image processing by a printing device. In such a method, a graphics orderlist is obtained by a printer engine. The graphics orderlist has at least one imaging issue for printing an associated image. A debug mode is entered for debugging the graphics orderlist. A selection for a debug region is received. A graphic order of the graphics orderlist is executed by a graphic execution unit of the printer engine in the debug mode. The graphic execution unit determines whether the debug region is accessed by the execution of the graphic order. Responsive to the debug region being accessed for the execution of the graphic order, an interrupt is issued. Information of the graphic order and buffer contents associated with the debug region is stored in a log file.

20 Claims, 9 Drawing Sheets

```
0x1A24B13E : 0x78    JSR
                         GOAo        0x00000000
                         LINK        0x75B7F5D7
0x555A0010 : 0x70    SET_DBAI
                         DBAI        0x02
0x555A0012 : 0x71    SET_SBAI
                         SBAI        0x00
0x555A0014 : 0x72    SET_HBAI
                         HBAI        0x06
0x555A0016 : 0x04    SET_DCMAP
                         DCMAP       0x07
0x555A0018 : 0x07    SET_DWARP
                         DWARP       0x0280
0x555A001B : 0x17    SET_HDEPTH
                         HDEPTH      0x07
0x555A001D : 0x0D    SET_BOOL_HD
                         BOOL        0xF0
0x555A001F : 0x28    SET_HAA
                         OFFSET      0xFFFFFFFF
0x555A0024 : 0x25    SET_HA1
                         OFFSET      0xFFFFFFB3
0x555A0029 : 0x47    SLT2C_HD
                         BAND        0x86
                         DAo         0x00000137
                         FH          0x0080
                         HXR         0x0000
```

GRAPHICS AND IMAGE PROCESSING FOR DEBUGGING FOR A PRINTING

FIELD

The following description relates to graphics and image processing. More particularly, the following description relates to graphics and image processing for debugging for a printing device.

BACKGROUND

Conventionally, in one page, there can be thousands of graphics orders. When an imaging issue occurs causing an unexpected pixel to appear at a coordinate in a page, it is a time intensive process to find which graphics order resulted in such an imaging issue. On an embedded system, this can be a time-consuming, very tedious process of debugging.

Even with current tools such as Visual Studio from Microsoft or GDB for Linux and embedded system environment, trying to find the suspicious graphics order is almost impossible. The Visual Studio is not ported and unusable when debugging on the printer engine. The GDB tool has memory limitations and multithreaded limitations that does not allow it to give accurate debugging diagnostics. Manual stepping through in the execution of each graphics orders may also affect the timing or synchronization operations of the embedded system processor, which then will alter the reproducibility of imaging issues or other problems.

One example of an imaging artifact issue used to occur in a print job and it could not be made to happen on the Windows environment, which would have been an easier environment for debugging through the use of Microsoft's Visual Studio. That problem would only occur on the printer engine. One of the differences between a Windows environment and an embedded system is that on the Windows environment, every operation is a simulation. They are not the exact same operations performed on the embedded system, mainly because of differences in hardware components, such as Hardware Graphics Execution Unit (HW-GEU), cache, ASIC, embedded operating system, among others.

SUMMARY

In accordance with one or more below described examples, a method relating generally to graphics and image processing is disclosed. In such a method, a graphics orderlist is obtained by a printer engine. The graphics orderlist has at least one imaging issue for printing an associated image. A debug mode is entered for debugging the graphics orderlist. A selection for a debug region is received. A graphic order of the graphics orderlist is executed by a graphic execution unit of the printer engine in the debug mode. The graphic execution unit determines whether the debug region is accessed by the execution of the graphic order. Responsive to the debug region being accessed for the execution of the graphic order, an interrupt is issued. Information of the graphic order and buffer contents associated with the debug region is stored in a log file.

In accordance with one or more below described examples, a system relating generally to graphics and image processing is disclosed. In such a system, a printing device has: a memory configured to store program code; and a printer engine coupled to the memory having a graphic execution unit. In response to executing the program code, the printing device is configured to initiate operations for implementing the graphics and image processing, including: obtaining a graphics orderlist by the printer engine, wherein the graphics orderlist has at least one imaging issue for printing an associated image on a print media; entering a debug mode for debugging the graphics orderlist; receiving a selection for a debug region; executing a graphic order of the graphics orderlist by the graphic execution unit of the printer engine in the debug mode; determining by the graphic execution unit whether the debug region is accessed by the execution of the graphic order; and responsive to the debug region being accessed for the execution of the graphic order, issuing an interrupt at an end of the graphic order; and storing information of the graphic order and buffer contents stored in the memory and associated with the debug region into a log file.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-1 is a block diagram depicting an example a known image processing unit.

FIG. 1-2 is a block diagram depicting an example of a known printing device.

FIG. 2-1 is a flow diagram depicting an example of a graphics and image processing debugging flow.

FIG. 2-2 is a pictorial diagram depicting an example of a printout with at least one imaging issue.

FIG. 2-3 is a pictorial diagram depicting an example of a printout of just sub-band region after correction of such at least one imaging issue.

FIG. 3-1 is a pictorial diagram depicting an example of an information flow.

FIG. 3-2 is a code listing depicting an example of a graphics orderlist.

DETAILED DESCRIPTION

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

A printer driver, which may be a device driver in Windows or other operating system, may be used to translate a document into a PDL print job. PDL data may be in any one of a variety of internal formats, such as XPS, PCL5, PCL6, PDF, or PostScript, among others.

Such a print job may be transmitted to a destination printer. However, in another example, a transmission phase may include intervening phases or sub-phases for "on-demand" or "pull" printing. For example, a print job may be transmitted to a print server or storage at or accessible by a print server, where such print job may be retrieved and downloaded from such print server or print server associated storage and then transmitted to a destination printer.

For a printer phase, a print job may be received at a job scheduler of an imaging device of a printer. Such a print job may be scheduled by such scheduler for processing by such an imaging device. Such a scheduled print job may then be passed to an image processor, such as for example a raster image processor ("RIP") of a printer, for page description language ("PDL") interpretation of such print job by one or more PDL interpreters of such an RIP for example.

A graphics renderer or graphics rendering service ("GRS"), which may be a component of an RIP for example, translates a print job's PDL description, commands and/or data, into graphics orders. Such graphics orders are generally an order list or "graphics orderlist" understandable by a graphics execution unit ("GEU") of a printer engine. For example, a GRS, which for example may be an internal component in RIP firmware or hardware, may generate for example a binary data representation of PDL commands or data. Graphics orders are low-level graphics instructions understandable by a GEU.

A GEU and a printer engine chip, which may be implemented for example as an Application Specific Integrated Circuit ("ASIC"), may generate a binary or rasterized representation, such as an image for example, of a print job or associated document from such graphics orders. For example, GRS generated binary or raster data may be understood and converted by GEU hardware to a drawing or pixels which may be drawn or rendered on paper. Conventionally, a GEU is implemented in hardware; however, for new or newer features and/or capabilities not yet ported to hardware, a software or firmware implementation of a GEU may be used.

Such a rasterized image may be scheduled for and subsequently passed down to lower-level printer engine components, such as a halftone engine, a video engine, a raster processing unit ("RPU"), a finishing unit, printer engine chip, and/or other components. Conventionally, an RPU is a firmware or hardware component of a printer engine or at a printer engine level. An RPU may be used for color conversion, stamp overlay, and/or other RPU associated operations.

Lastly, a print head of a printer engine may render or draw a resulting rasterized image onto a print medium, such as paper for example. Though an example of a printer printing onto paper is used, the following description may likewise apply to other forms of imaging devices like printers. Along those lines, even though the following description is in terms of a multi-function printer ("MFP"), a standalone or dedicated printer, scanner, and/or copier, among other imaging devices may be used.

With the above general understanding borne in mind, various configurations for systems, and methods therefor, with using a graphics processing debugger with a printer engine are generally described.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc., may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figure 11:
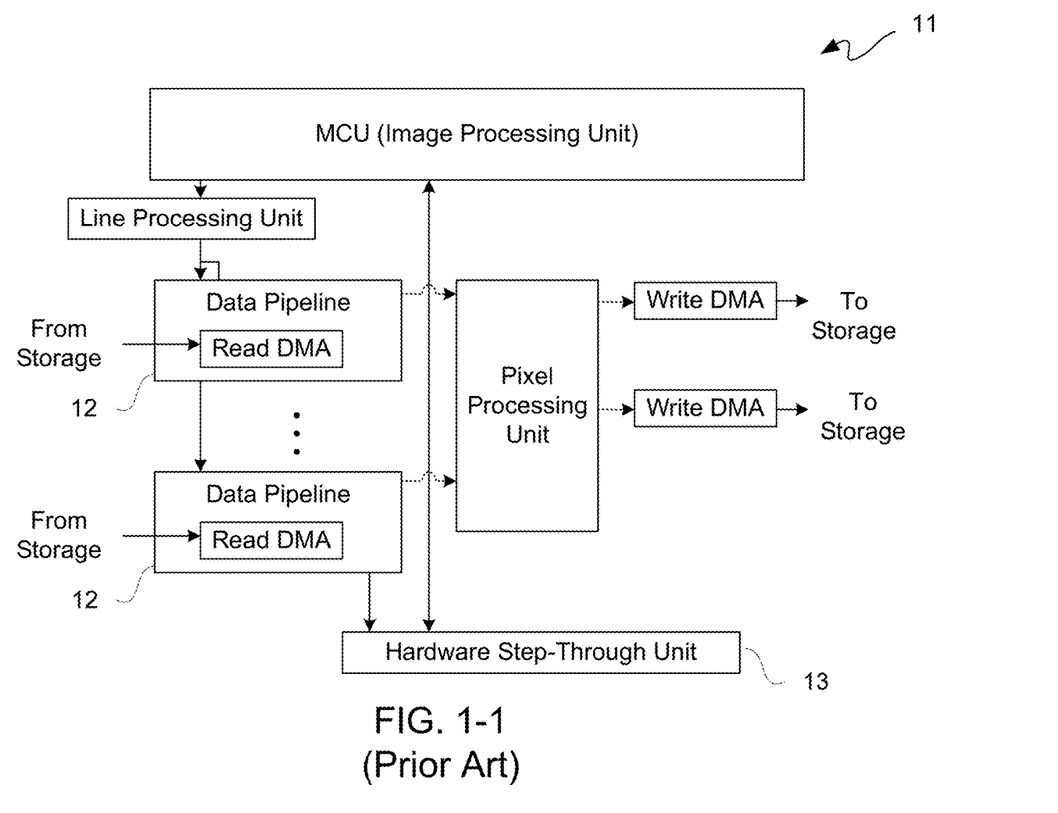

FIG. 1-1 is a block diagram depicting an example a known image processing unit 11. Image processing unit 11 may be for a printing device, such as image processing unit 612 of FIG. 6 described below in additional detail. In the context of a printing device, an image processing unit 11 may be a sub-component of a printer engine.

Generally, each data pipeline 12 may perform pixel processing by specifying a destination, a source, and a halftone for each color plane or layer for each CMYK color applied. Thus, a 10-by-10 pixel array for a set of color layers may include 100 pixels for each of a C color plane, an M color plane, a Y color plane, and a K color plane layered one on top of another to collectively provide a target CMYK color. Of course, CMYK respectively stand for cyan, magenta, yellow, and black, as is known. Additional details regarding image processing unit 11 may be found in U.S. Pat. Nos. 10,939,019 B1 and 11,039,037 B2, for example.

Image processing unit 11 includes a hardware step-through unit 13 for debugging hardware. Such a unit may be used for lock-step debugging, such as a clock cycle-by-clock cycle provided to clocked registers for a debugging process.

Figure 12:
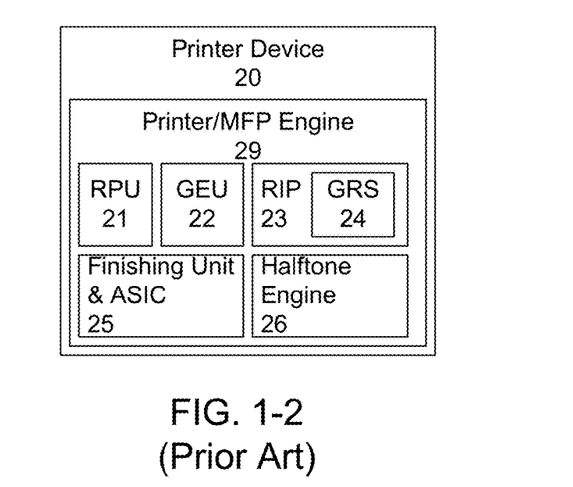

FIG. 1-2 is a block diagram depicting an example of a known printer or printing device 20. Printing device 20 may be a dedicated printer, a multi-function printer ("MFP"), or other printing device. For purposes of clarity by way of example and not limitation, it shall be assumed that printing device 20 is an MFP 20.

MFP 20 may include a printer/MFP engine ("printer engine") 29. Printer engine 29 may include an RPU 21, a GEU 22, an RIP 23 having a GRS 24, a finishing unit and MFP ASIC 25, and a halftone engine 26, among other known MFP 20 components.

Figure 21:
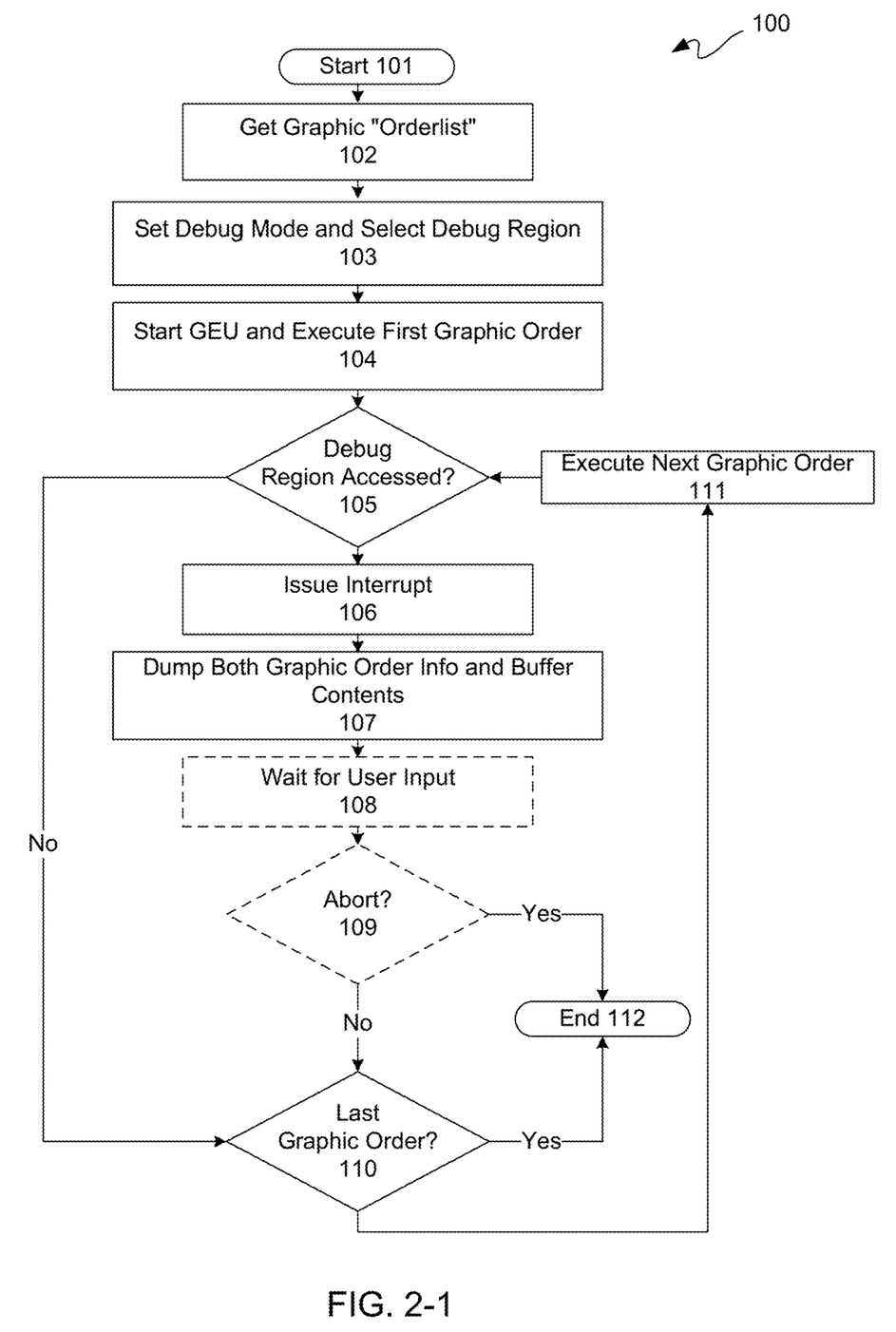

FIG. 2-1 is a flow diagram depicting an example of a graphics and image processing debugging flow 100. More particularly, graphics and image processing debugging flow 100 may be used for correcting print media for reprint, or prior to printing to print media.

Graphics and image processing debugging flow 100 may start at operation 101. At operation 102, a graphics orderlist may be obtained by a printer engine of a printing device. Such a graphics orderlist may be associated with a print job processed by a printer driver of a user's mobile phone, computer, a network, or other printer driver programmed electronic device. Such a graphics orderlist may have at least one imaging issue to be resolved prior to or discovered after printing an associated image on a print media.

As is known, a printer engine may receive a print job. Data of such a print job may be translated into a graphics orderlist by a printer driver for subsequent executing thereof by a printer engine, including for example by a GEU thereof. Print job data may for example be in a language selected from PCL5, PCL6, PDF, XPS, or PostScript prior to translating into a graphics orderlist understood by a GEU of a printer engine. A graphics orderlist instructs a GEU for layer-by-layer rendering of an image onto print media. So each layer may for example be a different color where a combination of each of such layers results in a resulting color.

At operation 103, a debug mode may be set or entered for debugging such a graphics orderlist obtained at operation 102. Further at operation 103, a user may input and a programmed printing device may receive a user's selection for at least one debug region. Such a selected debug region may have such at least one imaging issue therein when displayed or printed.

For example, an imaging issue may be an imaging artifact in an image in an embedded system space of a printer engine, such as for an embedded graphics rendering system, which is not present in image rendered in an operating system space. In which event, displaying an image on a display in an operating system space may not indicate an imaging issue. Rather, in such an event a print to print media may be used, and a corresponding section as between such a printout and a displayed image may be used. Optionally, such a printout may be scanned and then input for display on a display.

In an example where a display indicates an imaging error or a scanned printout displayed indicates an imaging error, a user selection may include conversion of user screen-related input into a set of parameters associated with a debug region. For example, an image displayed on a screen may be used for selection of a portion thereof, such as with a cursor pointing device or by touch screen. Such a selection may be used to translate image appearing on such screen to a debug region by using information temporarily stored in a display image buffer.

At operation 103, such a user selection may be associated with register settings of such a printing device. For example, register settings may include a page number, a band number, a begin horizontal or x location, a begin vertical or y location, an end horizontal or x location, and an end vertical or y location.

At operation 104, a GEU may be started to execute a graphic order of such a graphics orderlist. Additionally, at operation 104, a first graphic order of such a graphics orderlist may be executed by a GEU of such a printer engine.

At operation 105, a GEU may determine whether a debug region is accessed by executing of a graphic order. Determining by a GEU whether a debug region is accessed by executing of graphic order may include a read access or a write access of such a debug region. Thus, such debug region information may be obtained by access or after execution of a graphic order depending on printer engine configuration. More particularly, because a GEU may process a graphic order layer-by-layer, as previously described, a write access may be an initial write or an overwrite.

In this manner, each graphic order may be sequentially accessed and executed until a debug region is reached. Continuing the example of accessing a first graphic order in a graphics orderlist, at operation 105 it may be determined whether such selected debug region is associated with such first graphic order. If, at operation 105, it is determined that such first graphic order is not associated with such selected debug region, such as for example by comparing register settings values as between such selected debug region and those for such first graphic order, then at operation 110 it may be determined whether such first graphic order is a last graphic order of such graphics orderlist obtained at operation 102.

If, as determined at operation 110, such first graphic order is not a last graphic order of such a graphics orderlist, then at operation 111 a next graphic order in such graphics orderlist may be executed. Continuing the example of the first graphic order in a graphics orderlist being accessed first, a next graphic order may be the second graphic order in a graphics orderlist.

Operation 105 may be repeated for such next graphic order. Such loop may continue until a graphic order associated with a selected debug region is reached by sequencing through such graphics orderlist, or until all graphic orders of a graphics orderlist have been accessed.

If, at operation 110, it is determined all or a last graphic order in such a graphics orderlist has been executed, then graphics and image processing debugging flow 100 may end at operation 112.

If, at operation 105, it is determined that a debug region accessed and/or executed, thereby populating register settings for comparison with corresponding information debug region information, is associated with a selected debug region, then responsive to such a debug region being at least accessed for execution of a graphic order, an interrupt may be issued at operation 106. Such an interrupt may be issued at the end of a then current graphic order having just been executed. This may be used to ensure information associated with such execution of such graphic order is present in GEU register and buffer contents.

At operation 107, both graphic order information, such as in registers for example, and graphic buffer contents, such as in graphic buffer memory, may be "dumped" or unloaded or otherwise written to a file, such as a log file for example. Such dumped information and buffer contents for such a graphic order is associated with a selected debug region. A user may then evaluate such a log file to determine cause, and possibly correction, of such at least one imaging issue.

Prior to moving onto a next graphic order in such a graphics orderlist, optionally graphics and image processing debugging flow 100 may wait for user input. For example, a user may have selected more than one debug region at operation 103.

If a user has selected at least one other debug region yet to be reached for access and/or execution, then at operation 108 a user may provide a continue processing input, such as do not abort. At optional operation 109, it may be determined that a user is not ready to abort, and in response operation 110 may be executed as previously described. If, however, a user has for example one or more log files representing any and all selected debug regions, then a user may input abort at operation 108. In response to such an abort input, at operation 109 it may be determined a user desires to abort and graphics and image processing debugging flow 100 may end at operation 112.

Figure 22:
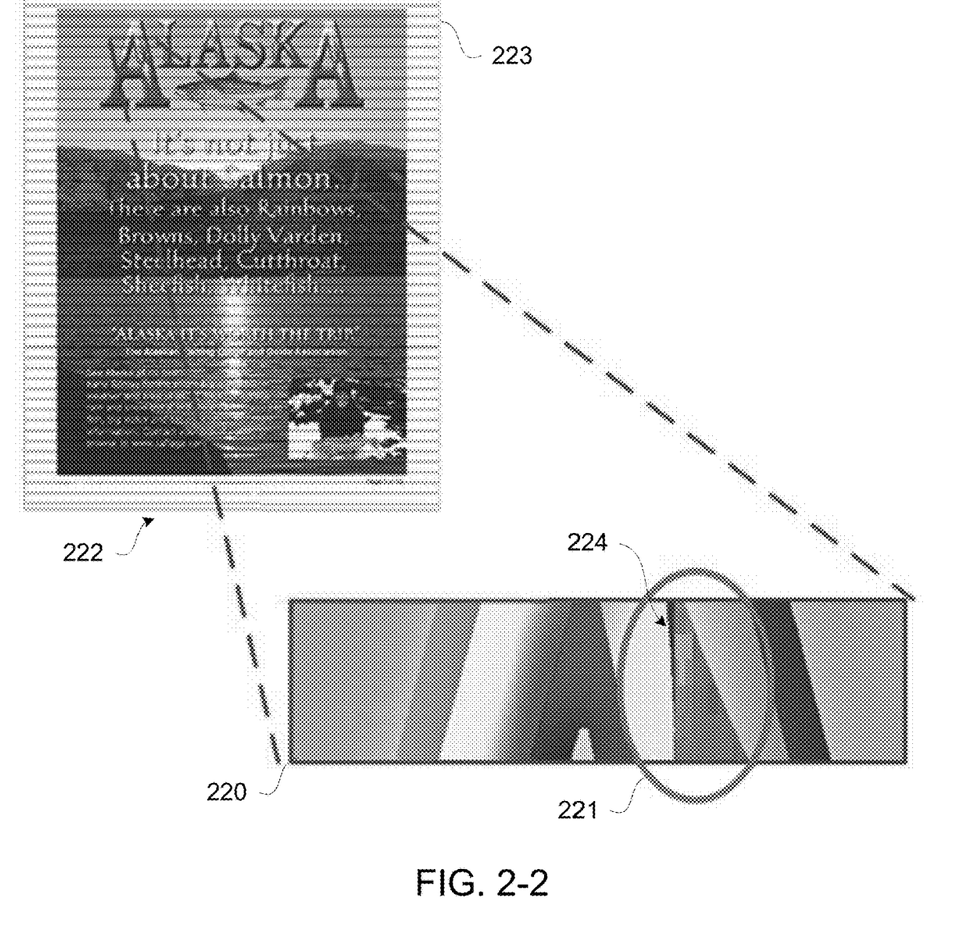

In order to further understand graphics and image processing debugging flow 100, FIG. 2-2 is a pictorial diagram depicting an example of a printout 222 with at least one imaging issue 224. In this example, bands 223 are illustratively depicted, but may not be included in an actual printout.

Along those lines, a GEU for example may divide each page of a print job into multiple bands. Thus, a page number of a print job may be used to identify a page on which an image is located, and a band number may be used to identify a horizontal subsection of such page in which an image or a portion thereof is located. Within such a horizontal subsection, (x, y) starting and ending coordinates may be used to target a portion or region of such horizontal subsection. By using a set of parameters including a page number, a band number, and x and y beginning and ending coordinates, a sub-band region 220 may be set to a sub-height and a sub-width of a band associated with a band number on a page. Again, such a page number, band number, and x and y beginning and ending coordinates may be obtained from register settings in a GEU.

In this example, at least one imaging issue 224 may be identified, such as visually for example by a user. A user may select a debug region 221 having therein such at least one imaging issue, and such a selected debug region 221 may be associated with a graphic order associated with sub-band region 220. Thus, a log file may have information for a select debug region with sub-band region granularity.

Figure 23:
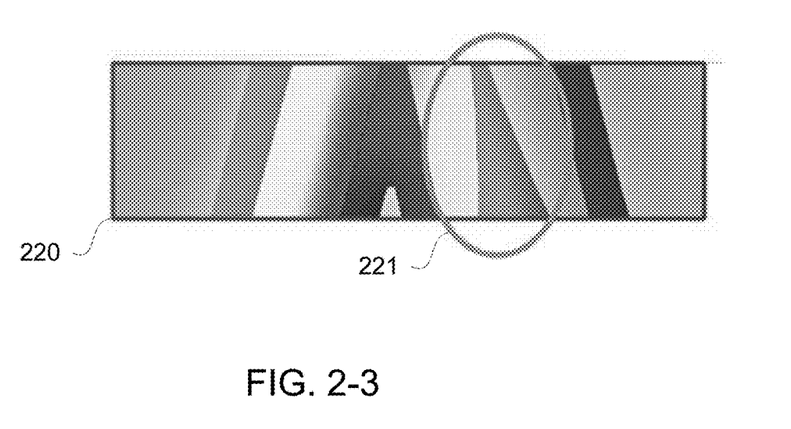

FIG. 2-3 is a pictorial diagram depicting an example of a printout of just sub-band region 220 after correction of such at least one imaging issue 224. In this example, debug region 221 has been corrected for printing to print media without any imaging artifact.

Figure 31:
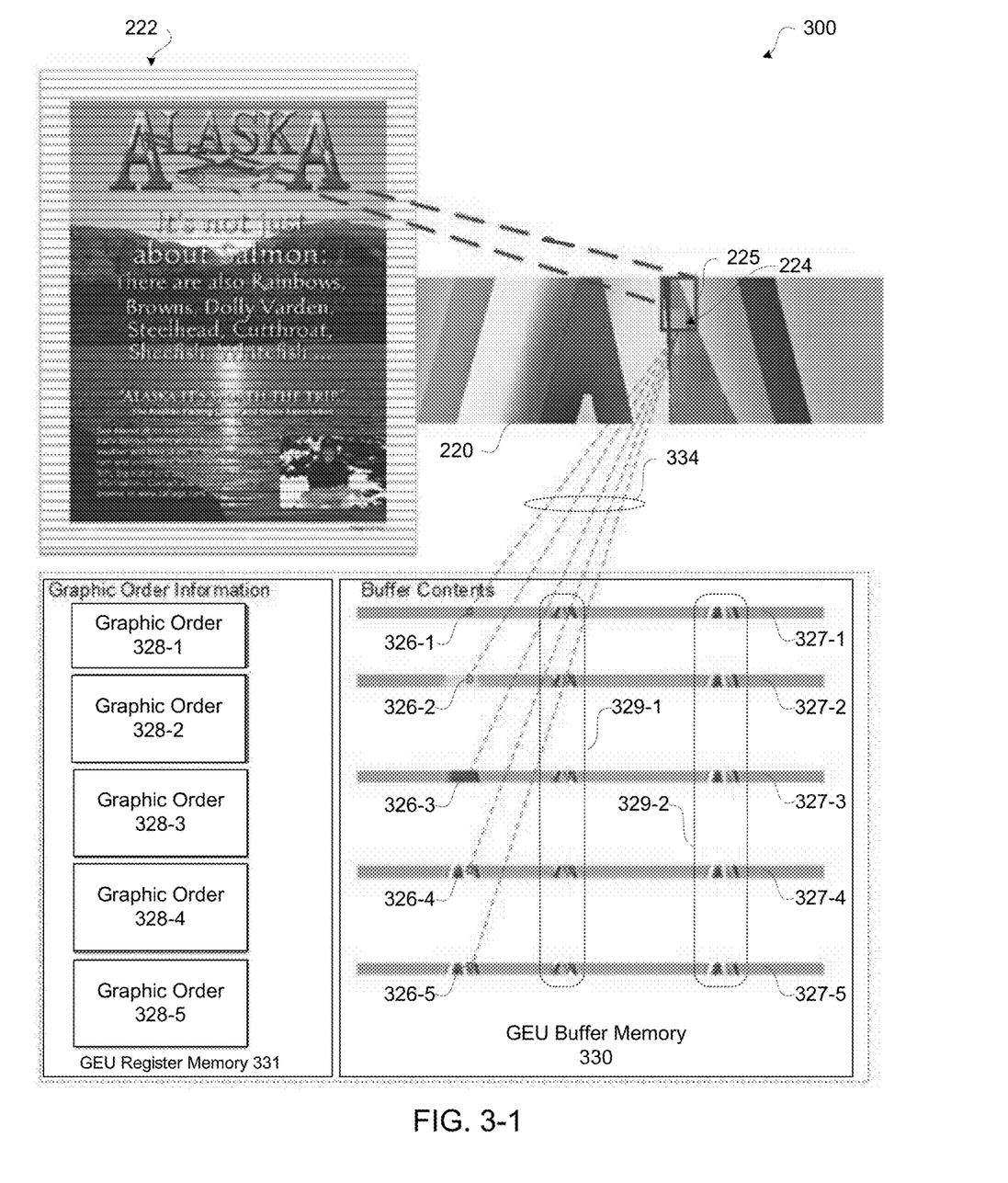

FIG. 3-1 is a pictorial diagram depicting an example of an information flow 300. Again, using the example of a printout 222 of a page (with band lines added for purposes of clarity and not limitation), a sub-band region 220 may be identified such as previously described.

An imaging artifact 224 mays be identified in an image-sub-band portion 225 of such sub-band region 220. In processing of such portion 225, buffer contents of buffer memory 330 may temporarily have information associated with such sub-band region 220, and more particularly such portion 225, as generally indicated with dashed lines 334.

In this example, buffer contents are for band layers 327-1 through 327-5, though fewer or more band layers may be used in other examples. Buffer contents in this example are for sub-band region 220.

Dashed lines 334 are associated with image information 326-1 through 326-5 respectively for band layers 327-1 through 327-5. More particularly, image information 326-1 through 326-5 is for a sequential progression of layer-by-layer processing starting from band layer 327-1 and ending with band layer 327-5.

Image information 329-1 and 329-2 in each of band layers 327-1 through 327-5 is respectively interim and completed layered image information for a portion of sub-band region 220 in buffer memory 330. Such interim and completed image information 329-1 and 329-2 may be repeated in each of band layers 327-1 and 327-5.

Processing of buffer contents associated with band layers 327-1 through 327-5 may correspond to graphic orders 328-1 through 328-5. Graphic orders 328-1 through 328-5 may be stored in register memory 331, such as in a register file for example. By obtaining register memory 331 contents and buffer memory 330 contents into a log file for example for an associated debug region 224, a user may correlate instructions or code of a graphic order with a corresponding set of image information for debugging an imaging artifact. This granularity and correlation of information may substantially reduce debug time. Register memory 331 and buffer memory 330 may be in a GEU.

Figure 32:
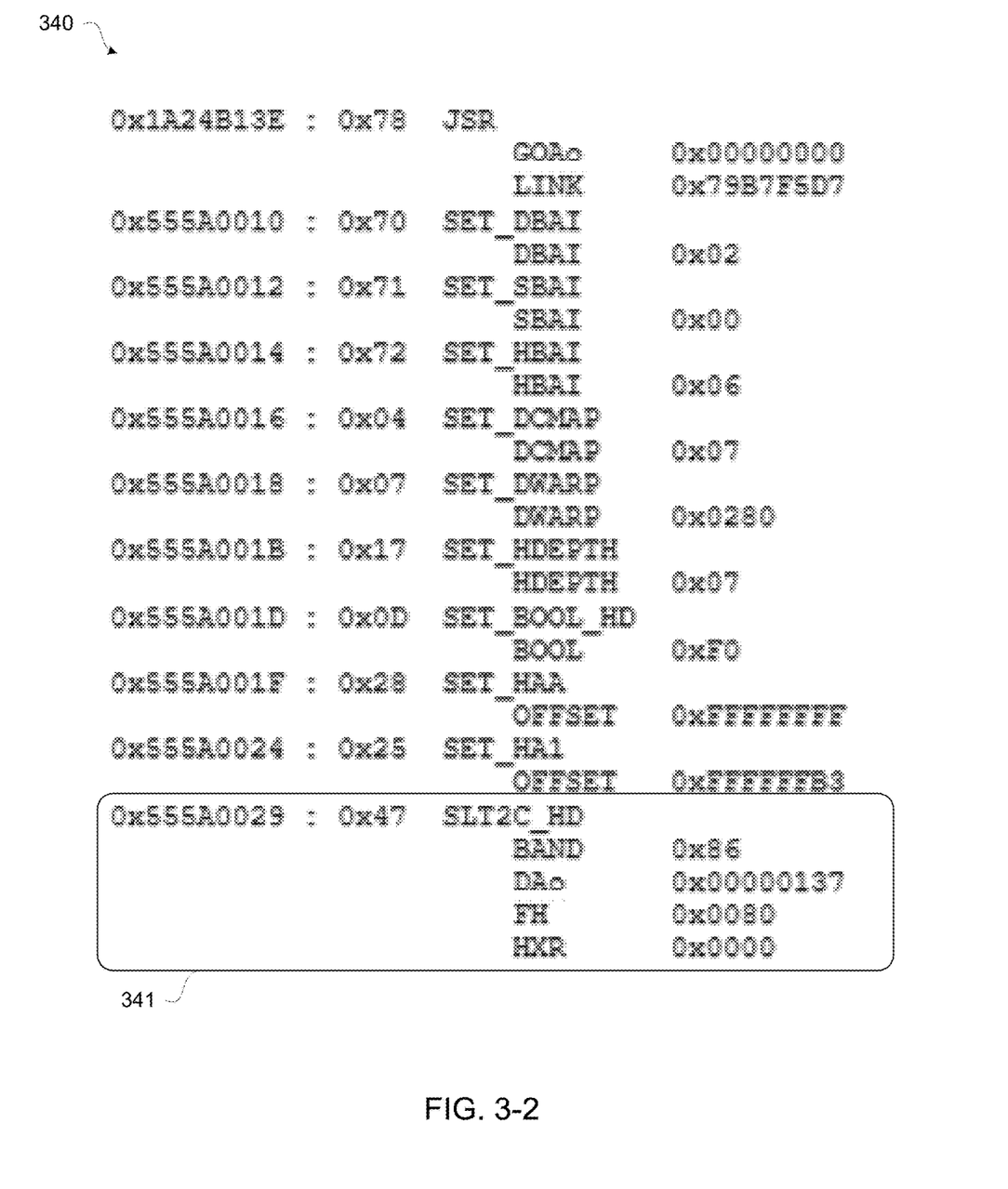

FIG. 3-2 is a code listing depicting an example of a graphics orderlist 340. A graphics orderlist 340 varies from among different images and may further vary with respect to different printers or manufacturers thereof. Along those lines, a graphic order 341 in a graphics orderlist 340 may likewise vary. Accordingly, the description hereof is not limited to any particular graphic order language or set of graphic orders.

Because one or more of the examples described herein may be implemented using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
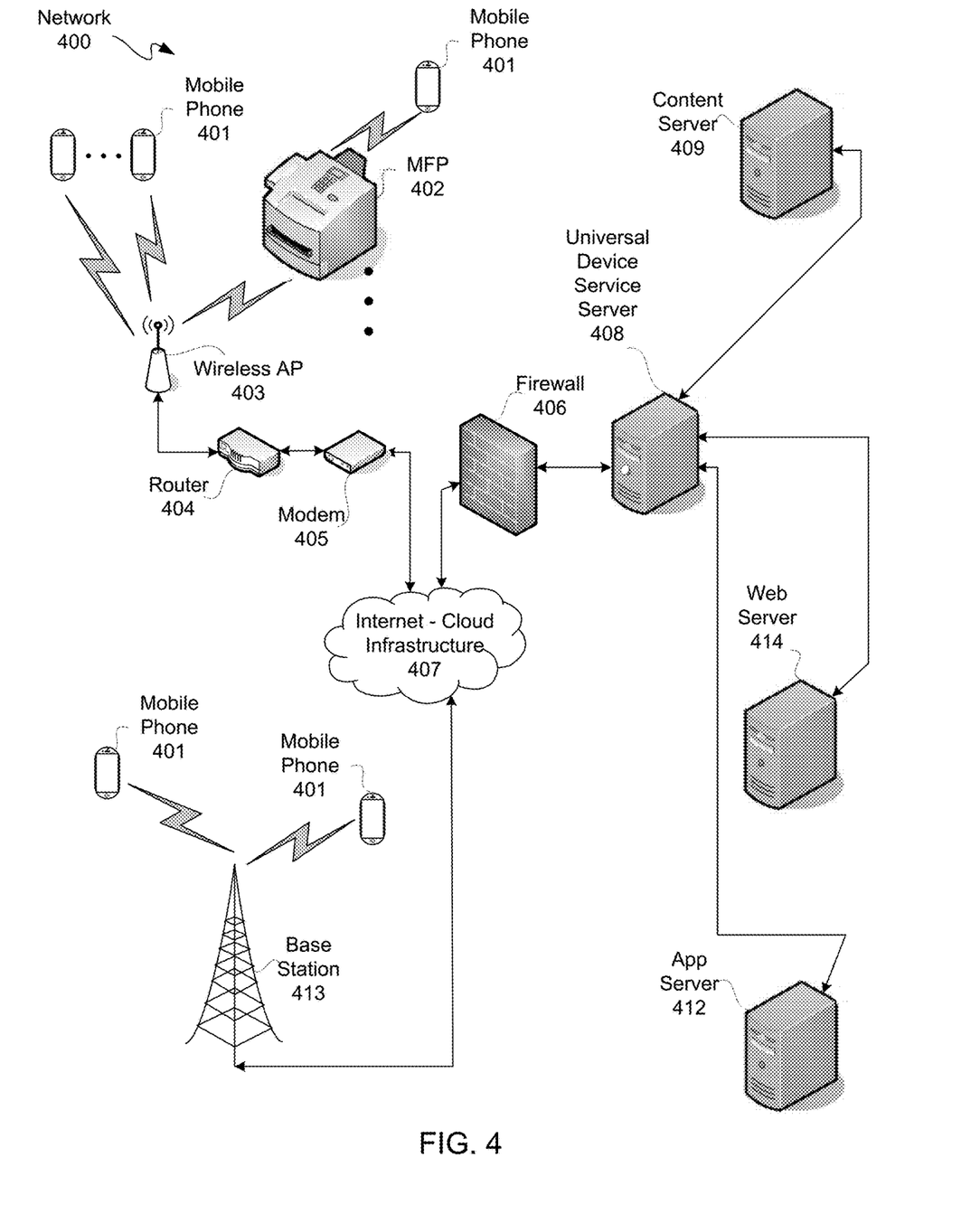
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router. Furthermore, one or more of such web-usable wireless devices 401 may be in wireless communication with a base station 413.

Additionally, a desktop computer and/or a printing device, such as for example one or more multi-function printer ("MFPs") 402, each of which may be web-usable devices, may be in wireless and/or wired communication to and from router 404. An MFP 402 may include at least one printer head as previously described herein.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
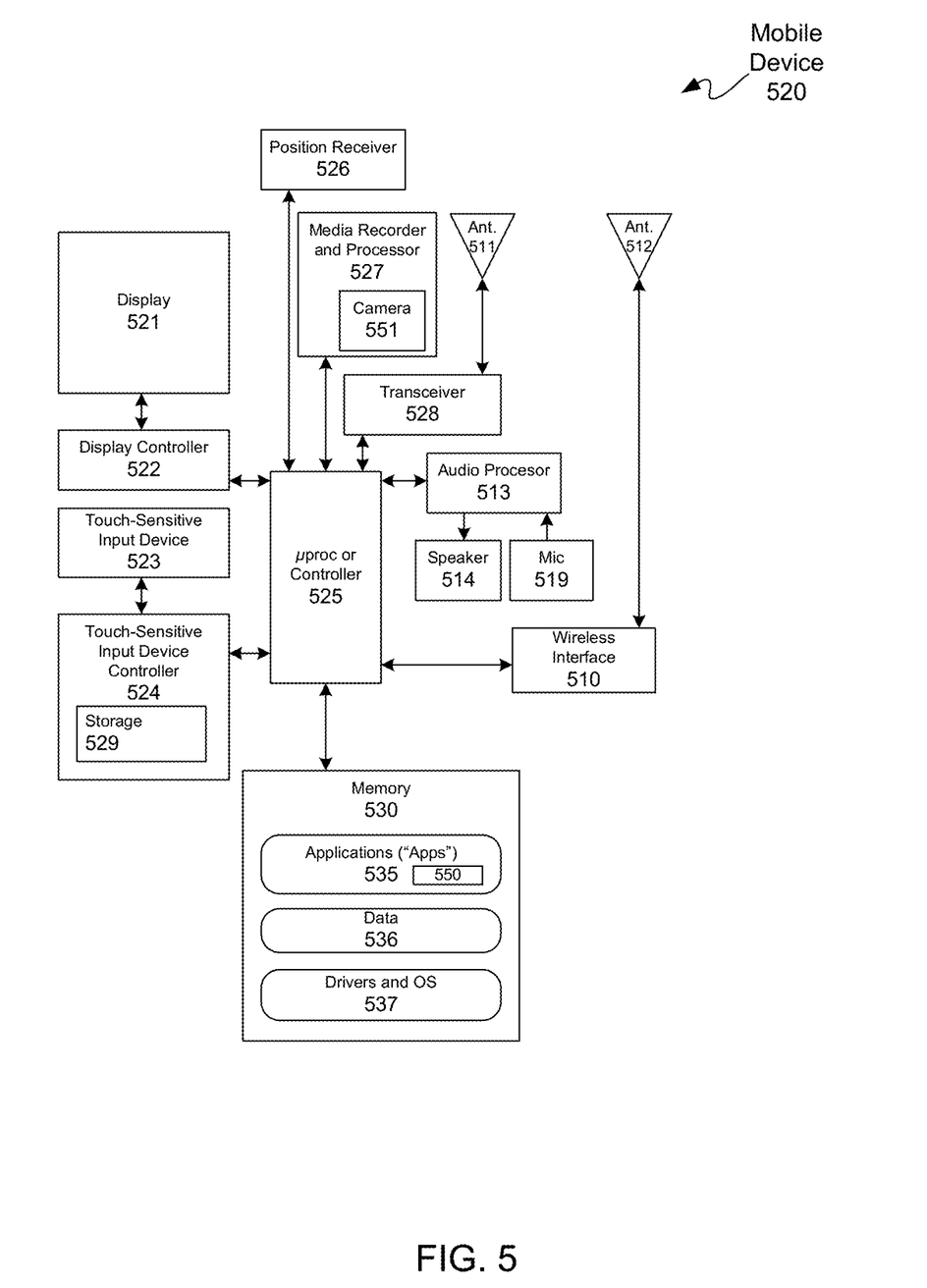
FIG. 5 is block diagram depicting an example of a portable communication device.

FIG. 5 is block diagram depicting an example of a portable communication device ("mobile device") 520. Mobile device 520 may be an example of a mobile device used to instruct a printing device.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data. Apps 535 may include an app 550 for a printer driver. However, in another example, a printer driver may be included in drivers 537.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera 551, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
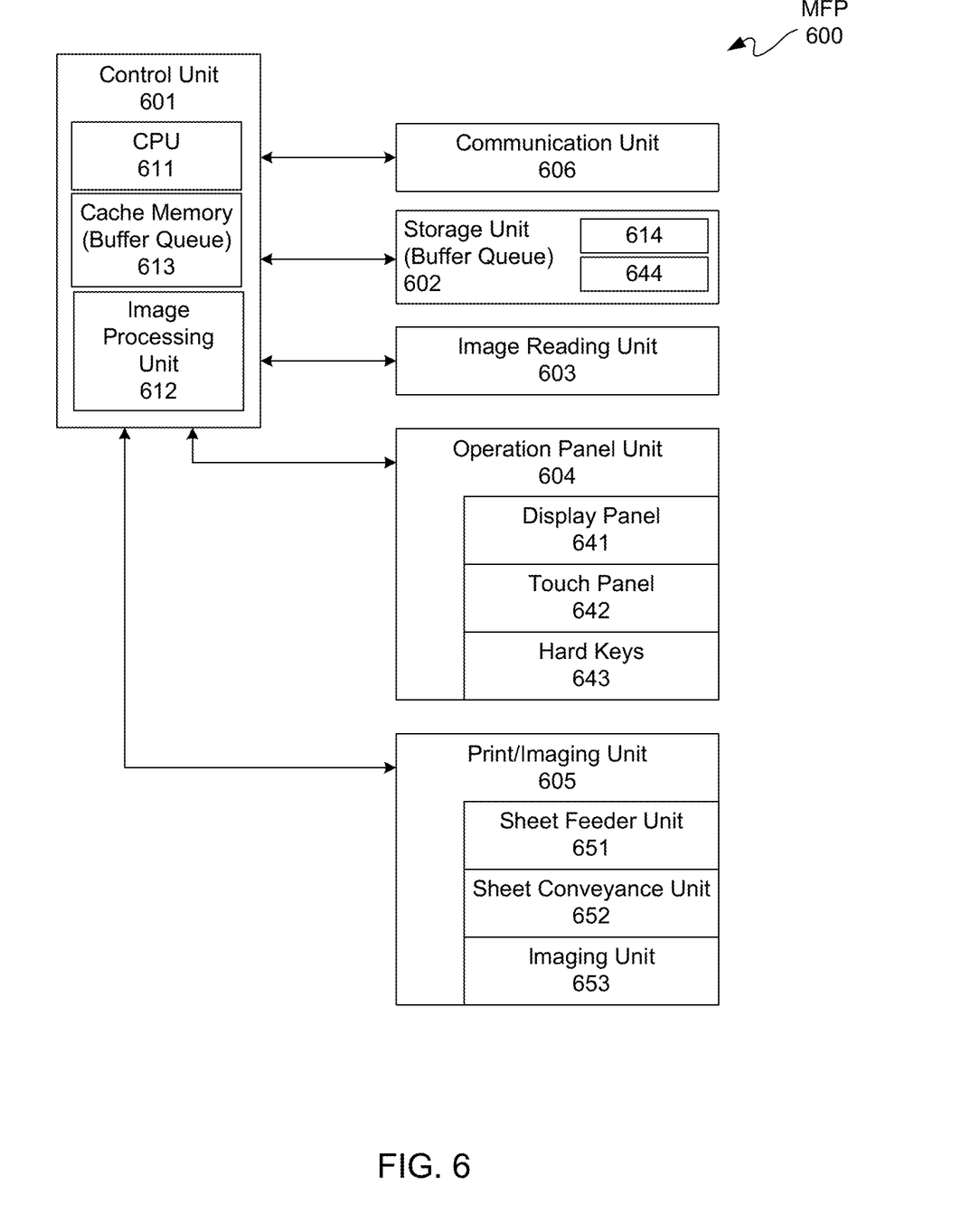
FIG. 6 is a block diagram depicting an example of a multi-function printer (MFP).

FIG. 6 is a block diagram depicting an example of a multi-function printer MFP 600. MFP 600 is provided for purposes of clarity by way of non-limiting example. MFP 600 is an example of an information processing system such as for handling a printer job.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer imaging pipeline program 614 and a printer job settings app 644. A buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
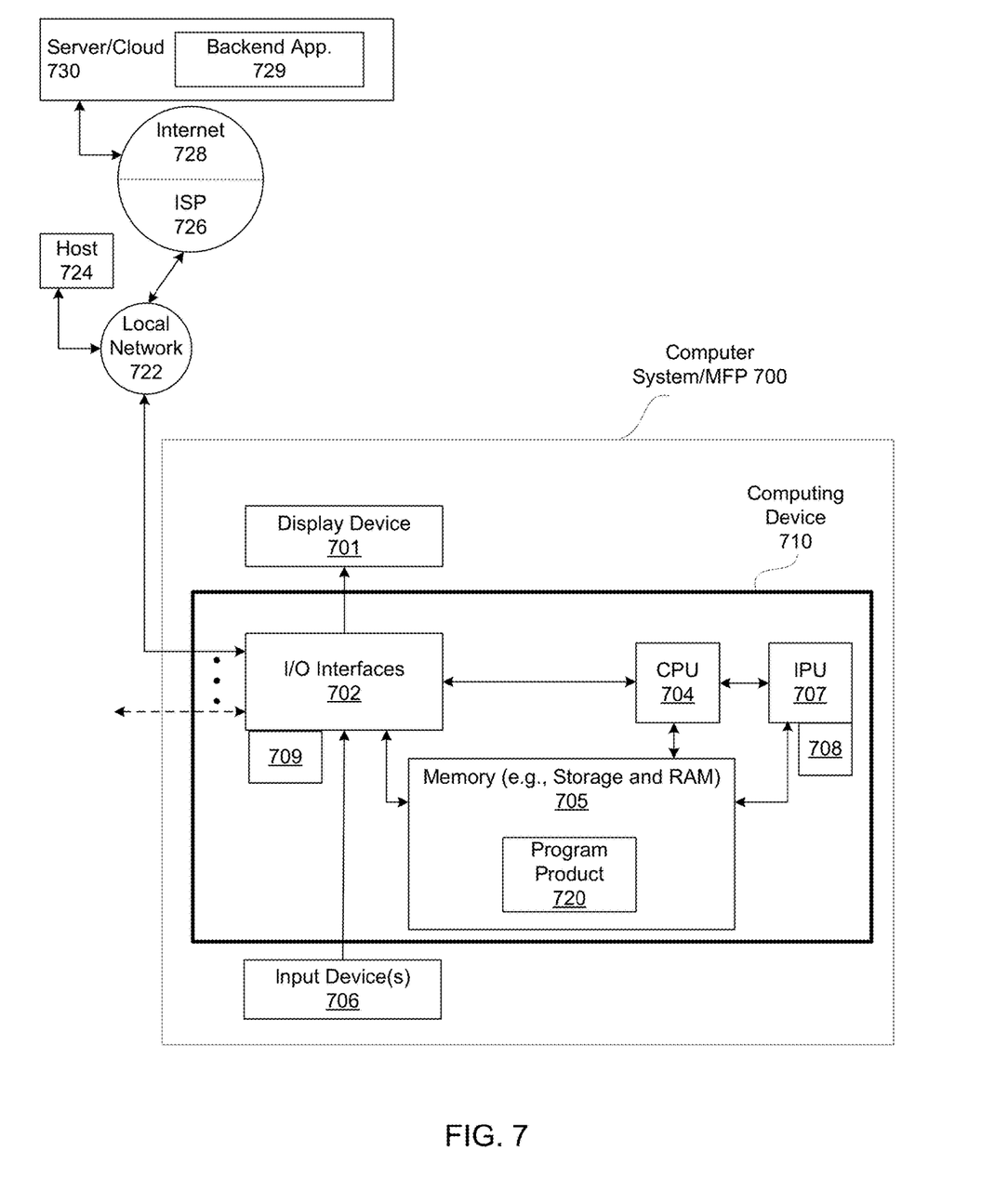
FIG. 7 is a block diagram depicting an example of a computer system.

FIG. 7 is a block diagram depicting an example of a computer system or MFP 700 ("computer system") upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide a program product 720. Program product 720 may be for implementing portions of process flows, as described herein. For example, program product 720 may include a printer driver as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for graphics and image processing, comprising:
   obtaining a graphics orderlist by a printer engine, wherein the graphics orderlist has at least one imaging issue for printing an associated image;
   entering a debug mode for debugging the graphics orderlist;
   receiving a selection for a debug region having the at least one imaging issue;
   the receiving of the selection including conversion of user screen-related input into a set of parameters associated with the debug region;
   executing a graphic order of the graphics orderlist by a graphic execution unit of the printer engine in the debug mode;
   determining by the graphic execution unit whether the debug region is accessed by the execution of the graphic order; and
   responsive to the debug region being accessed for the execution of the graphic order,
       issuing an interrupt; and
       storing information of the graphic order and buffer contents associated with the debug region in a log file;
   wherein the at least one imaging issue is an imaging artifact in the image in an embedded system space of the printer engine which is not present in the image rendered in an operating system space.

2. The method according to claim 1, wherein the determining by the graphic execution unit whether the debug region is accessed by the executing of the graphic order includes a read access or a write access of the debug region.

3. The method according to claim 2, further comprising:
   dividing each page of a print job into multiple bands;
   wherein the set of parameters includes a page number, a band number, and x and y beginning and ending coordinates of the debug region for a sub-height and a sub-width of a band associated with the band number.

4. The method according to claim 3, wherein the page number, the band number, and the x and y beginning and ending coordinates are obtained from register settings in the graphics execution unit.

5. The method according to claim 4, wherein the interrupt is issued at an end of the graphic order.

6. The method according to claim 5, further comprising translating data of the print job into the graphics orderlist by a printer driver for the executing.

7. The method according to claim 6, wherein the print job data is in a language selected from PCL5, PCL6, PDF, XPS, or PostScript prior to the translating into the graphics orderlist.

8. The method according to claim 2, wherein the graphics orderlist instructs the graphics execution unit layer-by-layer for rendering of the image onto print media.

9. The method according to claim 2, wherein the write access is an overwrite.

10. The method according to claim 2, wherein the graphic order is a first graphic order, the method further comprising:
    prompting a user to continue to a second graphic order in the graphics orderlist.

11. A system, comprising:
    a printing device having:
        a memory configured to store program code; and
        a printer engine coupled to the memory having a graphic execution unit;
    wherein, in response to executing the program code, the printing device is configured to initiate operations for implementing graphics and image processing, including:
        obtaining a graphics orderlist by the printer engine, wherein the graphics orderlist has at least one imaging issue for printing an associated image on a print media;
        entering a debug mode for debugging the graphics orderlist;

receiving a selection for a debug region having the at least one imaging issue;

the receiving of the selection including conversion of a user screen-related input into a set of parameters associated with the debug region;

executing a graphic order of the graphics orderlist by the graphic execution unit of the printer engine in the debug mode;

determining by the graphic execution unit whether the debug region is accessed by the execution of the graphic order; and responsive to the debug region being accessed for the execution of the graphic order, issuing an interrupt at an end of the graphic order; and storing information of the graphic order and buffer contents associated with the debug region in a log file;

wherein the at least one imaging issue is an imaging artifact in the image in an embedded system space of the printer engine which is not present in the image rendered in an operating system space.

12. The system according to claim 11, wherein the graphic execution unit is configured to execute an ordered sequence of the graphics orderlist.

13. The system according to claim 11, wherein the graphic execution unit is in hardware.

14. The system according to claim 11, wherein the determining by the graphic execution unit whether the debug region is accessed by the executing of the graphic order includes a read access or a write access of the debug region.

15. The system according to claim 14, wherein the operations further include:

dividing each page of a print job into multiple bands;

wherein the set of parameters includes a page number, a band number, and x and y beginning and ending coordinates of the debug region for a sub-height and a sub-width of a band associated with the band number.

16. The system according to claim 15, wherein the page number, the band number, and the x and y beginning and ending coordinates are obtained from register settings stored in registers of the graphics execution unit.

17. A method for graphics and image processing, comprising:

obtaining a graphics orderlist by a printer engine, wherein the graphics orderlist has at least one imaging issue for printing an associated image;

entering a debug mode for debugging the graphics orderlist;

receiving a selection for a debug region;

executing a graphic order of the graphics orderlist by a graphic execution unit of the printer engine in the debug mode;

determining by the graphic execution unit whether the debug region is accessed by the execution of the graphic order;

responsive to the debug region being accessed for the execution of the graphic order, issuing an interrupt; and storing information of the graphic order and buffer contents associated with the debug region in a log file;

wherein the determining by the graphic execution unit whether the debug region is accessed by the executing of the graphic order includes a read access or a write access of the debug region;

wherein the selection includes conversion of user screen-related input into a set of parameters associated with the debug region; and dividing each page of a print job into multiple bands;

wherein the set of parameters includes a page number, a band number, and x and y beginning and ending coordinates of the debug region for a sub-height and a sub-width of a band associated with the band number.

18. The method according to claim 17, wherein the page number, the band number, and the x and y beginning and ending coordinates are obtained from register settings in the graphics execution unit.

19. The method according to claim 18, wherein the interrupt is issued at an end of the graphic order.

20. The method according to claim 19, further comprising translating data of the print job into the graphics orderlist by a printer driver for the executing.

* * * * *